United States Patent
Laselva et al.

(10) Patent No.: US 10,542,573 B2
(45) Date of Patent: Jan. 21, 2020

(54) RADIO AGGREGATION

(71) Applicant: Nokia Solutions and Networks Oy, Espoo (FI)

(72) Inventors: Daniela Laselva, Klarup (DK); Jeroen Wigard, Klarup (DK); István Zsolt Kovács, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/747,665

(22) PCT Filed: Aug. 11, 2015

(86) PCT No.: PCT/EP2015/068415
§ 371 (c)(1),
(2) Date: Jan. 25, 2018

(87) PCT Pub. No.: WO2017/025129
PCT Pub. Date: Feb. 16, 2017

(65) Prior Publication Data
US 2018/0220474 A1 Aug. 2, 2018

(51) Int. Cl.
*H04W 76/11* (2018.01)
*H04W 76/15* (2018.01)
(Continued)

(52) U.S. Cl.
CPC ............ *H04W 76/11* (2018.02); *H04W 28/08* (2013.01); *H04W 48/18* (2013.01); *H04W 76/15* (2018.02); *H04W 88/08* (2013.01)

(58) Field of Classification Search
CPC . H04W 76/15; H04W 76/11; H04W 36/0069; H04W 28/08; H04W 48/16; H04W 48/18; H04W 88/06; H04W 88/08
(Continued)

(56) References Cited

U.S. PATENT DOCUMENTS

2016/0029295 A1   1/2016  Nagasaka et al.
2018/0192346 A1*  7/2018  Nagasaka ............. H04W 28/08

FOREIGN PATENT DOCUMENTS

WO   WO-2013/023353 A1   2/2013
WO     2014/111808 A2    7/2014
(Continued)

OTHER PUBLICATIONS

3GPP TS 36.304 V12.5.0 (Jun. 2015), Evolved Universal Terrestrial Radio Access (E-UTRA); User Equipment (UE) procedures in idle mode (Release 12) (Year: 2015).*
(Continued)

*Primary Examiner* — Yemane Mesfin
*Assistant Examiner* — Intekhaab A Siddiquee
(74) *Attorney, Agent, or Firm* — Harrington & Smith

(57) ABSTRACT

A technique comprising: transmitting one or more radio signals comprising information for use by a communication device camped in idle mode on a first node operating according to a first radio access technology or connected to said first node, which information comprises information facilitating the prioritisation at the communication device of initiating an association with a node operating according to a second radio access technology and having a capability of functioning as a slave node in a radio aggregation technique involving said first node as a master node, over initiating an association with a node operating to said second radio access technology without said aggregation capability.

20 Claims, 5 Drawing Sheets

(51) Int. Cl.
*H04W 48/18* (2009.01)
*H04W 28/08* (2009.01)
*H04W 88/08* (2009.01)
*H04W 48/16* (2009.01)
*H04W 88/06* (2009.01)
*H04W 36/00* (2009.01)

(58) Field of Classification Search
USPC .......................................................... 370/329
See application file for complete search history.

(56) References Cited

FOREIGN PATENT DOCUMENTS

| WO | 2014/148969 A1 | 9/2014 |
|---|---|---|
| WO | WO-2014162905 A1 | 2/2017 |

OTHER PUBLICATIONS

3GPP TS 36.331 V12.6.0 (Jun. 2015), Evolved Universal Terrestrial Radio Access (E-UTRA); Radio Resource Control (RRC); Protocol specification (Release 12) (Year: 2015).*

"New WI Proposal: LTE-WLAN Radio Level Integration and Interworking Enhancement", 3GPP TSG RAN Meeting #67, RP-150510, Intel Corporation, Agenda Item: 13.1.2, Mar. 9-12, 2015, 9 pages.

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.4.0, Mar. 2015, pp. 1-38.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.6.0, Jun. 2015, pp. 1-449.

International Search Report and Written Opinion received for corresponding Patent Cooperation Treaty Application No. PCT/EP2015/068415, dated Jun. 29, 2016, 17 pages.

LG Electronics Inc. "RAN/WLAN Aggregation Procedure" 3GPP TSG-RAN WG2 #89bis R2-151654. Bratislava, Slovakia, Apr. 20-24, 2013.

3GPP TSG RAN WG2, Meeting #90, R2-152738 "Control Plane Architecture for LTE-WLAN Aggregation" Fukuoka, Japan, May 25-29, 2015.

3GPP TSG RAN WG2, Meeting # 90, R2-152238 "Consideration on UE WLAN Measurement for the LTE/WLAN Aggregation and Interworking Enhancements" Fukuoka, Japan, May 25-29, 2015.

3GPP TSG RAN WG2, Meeting #90, R2-152543 "Considerations on the Measurement for LTE/WLAN Aggregation and Interworking Enhancements" Fukuoka, Japan, May 25-29, 2015.

* cited by examiner

RADIO AGGREGATION

RELATED APPLICATION

This application was originally filed as PCT Application No. PCT/EP2015/068415 filed Aug. 11, 2015.

Radio aggregation involves transmitting and/or receiving user plane data to/from a radio network entity via two radio access nodes under the control of one (master node) of said access nodes.

Radio aggregation involving two or more nodes operating according to the same radio access technology is currently under standardisation in 3GPP (Third Generation Partnership Project) Release 12; and there is also a proposal for 3GPP Release 13 to introduce radio aggregation involving two or more nodes operating to different radio access technologies.

The inventors for the present application have identified the aim of better facilitating radio aggregation involving two or more nodes operating to different radio access technologies.

There is hereby provided a method comprising: transmitting one or more radio signals comprising information for use by a communication device camped in idle mode on a first node operating according to a first radio access technology or already connected to said first node, which information comprises information facilitating a determination at the communication device about (i) both initiating a new connection to the first node and initiating an association with a node operating according to a second radio access technology and having a capability of functioning as a slave node in a radio aggregation technique involving said first node as a master node.

According to one embodiment, said information comprises information facilitating a determination at the communication device about (i) in favour of (ii) initiating a new connection to the first node without initiating any association with any node operating according to said second radio access technology or initiating an association with a node operating according to said radio access technology without initiating a new connection to the first node There is also hereby provided a method comprising: transmitting one or more radio signals comprising information for use by a communication device camped in idle mode on a first node operating according to a first radio access technology or connected to said first node, which information comprises information facilitating the prioritisation at the communication device of initiating an association with a node operating according to a second radio access technology and having a capability of functioning as a slave node in a radio aggregation technique involving said first node as a master node, over initiating an association with a node operating to said second radio access technology without said aggregation capability.

According to one embodiment, said information indicates a first set of conditions to evaluate initiation of an association with a node operating to said second radio access technology and having a capability of functioning as a slave node in a radio aggregation technique involving said first node as a master node, and indicates a second set of conditions to evaluate initiation of an association with a node operating to said second radio access technology for offloading data from said first node other than via a radio aggregation technique.

According to one embodiment, said information indicates which nodes operating according to said second radio access technology in the area served by said first node have said aggregation capability.

According to one embodiment, the method further comprises transmitting one or more radio signals comprising an indication about whether to make any selection of a node operating according to a second radio access technology in addition to initiating a new connection with said first node.

According to one embodiment, the method further comprises transmitting one or more radio signals comprising an indication about whether to use said information for any selection of a node operating to a second radio access technology.

There is also hereby provided a method comprising: determining, at a communication device camped in idle mode on a first node operating according to a first radio access technology or already connected to said first node, about (i) both initiating a new connection with the first node and initiating an association with a node operating to a second radio access technology and having a capability of functioning as a slave node in a radio aggregation technique involving said first node as a master node.

According to one embodiment, the method further comprises determining about (i) in favour of (ii) initiating a new connection to the first node without initiating any association with any node operating according to said second radio access technology or initiating an association with a node operating according to said radio access technology without initiating a new connection to the first node.

There is also hereby provided a method comprising: determining, at a communication device camped in idle mode on a first node operating according to a first radio access technology or already connected to said first node, whether to prioritise initiating an association with a node operating according to a second radio access technology and having a capability of functioning as a slave node in a radio aggregation technique involving said first node as a master node, over initiating an association with a node operating to said second radio access technology without said aggregation capability; selecting a second radio access technology node with which to initiate an association; and initiating an association with the selected second radio access technology node.

According to one embodiment, said determining is done at least partly on the basis of evaluation information recovered from radio signals detected at the communication device.

According to one embodiment, said information indicates a first set of one or more conditions for evaluating initiation of an association with a node operating to said second radio access technology and having said aggregation capability, and a second set of one or more conditions for evaluating initiation of an association with a node operating to said second radio access technology for offloading data from said first node other than via a radio aggregation technique.

According to one embodiment, said information further indicates which nodes operating according to a second radio access technology in the area served by said first node have a capability of functioning as a slave node in a radio aggregation technique involving said first node as a master node.

According to one embodiment, the method further comprises: performing measurements of radio signals transmitted by nodes according to said second radio access technology.

According to one embodiment, the method further comprises determining whether any radio signals detected at the communication device identify one or more second radio access technology nodes identified in said information.

According to one embodiment, the method further comprises: determining, based at least partly on the radio signals detected at the communication device, whether any one or more second radio access technology nodes identified in said information meet said first set of conditions; and in the event of a positive determination, initiating an association with a second radio access technology node that meets said first set of conditions.

According to one embodiment, the method further comprises: in the event of detecting no second radio access technology node that meets said first set of conditions, determining, based at least partly on the radio signals detected at the communication device, whether any one or more detected second radio access technology nodes meets said second set of conditions; and in the event of a positive determination, initiating an association with a second radio access technology nodes that meets said second set of conditions.

According to one embodiment, the method further comprises: in the event of a determination that no detected second radio access technology node meets said second set of conditions, initiating a new connection with the first node without initiating any association with any second radio access technology node.

There is also hereby provided a method comprising: at a communication device camped in idle mode on a first node operating according to a first radio access technology or connected to said first node, checking for the recovery from radio signals transmitted by said first node of an instruction to perform measurements at the communication device of radio signals according to a second radio access technology.

There is also hereby provided an apparatus comprising: a processor and memory including computer program code, wherein the memory and computer program code are configured to, with the processor, cause the apparatus to: transmit one or more radio signals comprising information for use by a communication device camped in idle mode on a first node operating according to a first radio access technology or already connected to said first node, which information comprises information facilitating a determination at the communication device about (i) both initiating a new connection to the first node and initiating an association with a node operating according to a second radio access technology and having a capability of functioning as a slave node in a radio aggregation technique involving said first node as a master node.

According to one embodiment, said information comprises information facilitating a determination at the communication device about (i) in favour of (ii) initiating a new connection to the first node without initiating any association with any node operating according to said second radio access technology or initiating an association with a node operating according to said radio access technology without initiating a new connection to the first node There is also hereby provided an apparatus comprising: a processor and memory including computer program code, wherein the memory and computer program code are configured to, with the processor, cause the apparatus to: transmit one or more radio signals comprising information for use by a communication device camped in idle mode on a first node operating according to a first radio access technology or connected to said first node, which information comprises information facilitating the prioritisation at the communication device of initiating an association with a node operating according to a second radio access technology and having a capability of functioning as a slave node in a radio aggregation technique involving said first node as a master node, over initiating an association with a node operating to said second radio access technology without said aggregation capability.

According to one embodiment, said information indicates a first set of conditions to evaluate initiation of an association with a node operating to said second radio access technology and having a capability of functioning as a slave node in a radio aggregation technique involving said first node as a master node, and indicates a second set of conditions to evaluate initiation of an association with a node operating to said second radio access technology for offloading data from said first node other than via a radio aggregation technique.

According to one embodiment, said information indicates which nodes operating according to said second radio access technology in the area served by said first node have said aggregation capability.

According to one embodiment, the memory and computer program code are further configured to, with the processor, cause the apparatus to: transmit one or more radio signals comprising an indication about whether to make any selection of a node operating according to a second radio access technology in addition to initiating a new connection with said first node.

According to one embodiment, the memory and computer program code are further configured to, with the processor, cause the apparatus to: transmit one or more radio signals comprising an indication about whether to use said information for any selection of a node operating to a second radio access technology.

There is also hereby provided an apparatus comprising: a processor and memory including computer program code, wherein the memory and computer program code are configured to, with the processor, cause the apparatus to: determine, at a communication device camped in idle mode on a first node operating according to a first radio access technology or already connected to said first node, about (i) both initiating a new connection with the first node and initiating an association with a node operating to a second radio access technology and having a capability of functioning as a slave node in a radio aggregation technique involving said first node as a master node.

According to one embodiment, the memory and computer program code are further configured to, with the processor, cause the apparatus to: determine about (i) in favour of (ii) initiating a new connection to the first node without initiating any association with any node operating according to said second radio access technology or initiating an association with a node operating according to said radio access technology without initiating a new connection to the first node.

There is also hereby provided an apparatus comprising: a processor and memory including computer program code, wherein the memory and computer program code are configured to, with the processor, cause the apparatus to: determine, at a communication device camped in idle mode on a first node operating according to a first radio access technology or already connected to said first node, whether to prioritise initiating an association with a node operating according to a second radio access technology and having a capability of functioning as a slave node in a radio aggregation technique involving said first node as a master node, over initiating an association with a node operating to said second radio access technology without said aggregation capability; select a second radio access technology node with which to initiate an association; and initiate an association with the selected second radio access technology node.

According to one embodiment, said determining is done at least partly on the basis of evaluation information recovered from radio signals detected at the communication device.

According to one embodiment, said information indicates a first set of one or more conditions for evaluating initiation of an association with a node operating to said second radio access technology and having said aggregation capability, and a second set of one or more conditions for evaluating initiation of an association with a node operating to said second radio access technology for offloading data from said first node other than via a radio aggregation technique.

According to one embodiment, said information further indicates which nodes operating according to a second radio access technology in the area served by said first node have a capability of functioning as a slave node in a radio aggregation technique involving said first node as a master node.

According to one embodiment, the memory and computer program code are further configured to, with the processor, cause the apparatus to: perform measurements of radio signals transmitted by nodes according to said second radio access technology.

According to one embodiment, the memory and computer program code are further configured to, with the processor, cause the apparatus to: determine whether any radio signals detected at the communication device identify one or more second radio access technology nodes identified in said information.

According to one embodiment, the memory and computer program code are further configured to, with the processor, cause the apparatus to: determine, based at least partly on the radio signals detected at the communication device, whether any one or more second radio access technology nodes identified in said information meet said first set of conditions; and in the event of a positive determination, initiate an association with a second radio access technology node that meets said first set of conditions.

According to one embodiment, the memory and computer program code are further configured to, with the processor, cause the apparatus to: in the event of detecting no second radio access technology node that meets said first set of conditions, determine, based at least partly on the radio signals detected at the communication device, whether any one or more detected second radio access technology nodes meets said second set of conditions; and in the event of a positive determination, initiate an association with a second radio access technology nodes that meets said second set of conditions.

According to one embodiment, the memory and computer program code are further configured to, with the processor, cause the apparatus to: in the event of a determination that no detected second radio access technology node meets said second set of conditions, initiate a new connection with the first node without initiating any association with any second radio access technology node.

There is also hereby provided an apparatus comprising: a processor and memory including computer program code, wherein the memory and computer program code are configured to, with the processor, cause the apparatus to: at a communication device camped in idle mode on a first node operating according to a first radio access technology or connected to said first node, check for the recovery from radio signals transmitted by said first node of an instruction to perform measurements at the communication device of radio signals according to a second radio access technology.

There is also hereby provided a computer program product comprising program code means which when loaded into a computer controls the computer to: transmit one or more radio signals comprising information for use by a communication device camped in idle mode on a first node operating according to a first radio access technology or already connected to said first node, which information comprises information facilitating a determination at the communication device about (i) both initiating a new connection to the first node and initiating an association with a node operating according to a second radio access technology and having a capability of functioning as a slave node in a radio aggregation technique involving said first node as a master node.

There is also hereby provided a computer program product comprising program code means which when loaded into a computer controls the computer to: transmit one or more radio signals comprising information for use by a communication device camped in idle mode on a first node operating according to a first radio access technology or connected to said first node, which information comprises information facilitating the prioritisation at the communication device of initiating an association with a node operating according to a second radio access technology and having a capability of functioning as a slave node in a radio aggregation technique involving said first node as a master node, over initiating an association with a node operating to said second radio access technology without said aggregation capability.

There is also hereby provided a computer program product comprising program code means which when loaded into a computer controls the computer to: determine, at a communication device camped in idle mode on a first node operating according to a first radio access technology or already connected to said first node, about (i) both initiating a new connection with the first node and initiating an association with a node operating to a second radio access technology and having a capability of functioning as a slave node in a radio aggregation technique involving said first node as a master node.

There is also hereby provided a computer program product comprising program code means which when loaded into a computer controls the computer to: determine, at a communication device camped in idle mode on a first node operating according to a first radio access technology or already connected to said first node, whether to prioritise initiating an association with a node operating according to a second radio access technology and having a capability of functioning as a slave node in a radio aggregation technique involving said first node as a master node, over initiating an association with a node operating to said second radio access technology without said aggregation capability; select a second radio access technology node with which to initiate an association; and initiate an association with the selected second radio access technology node.

There is also hereby provided a computer program product comprising program code means which when loaded into a computer controls the computer to: at a communication device camped in idle mode on a first node operating according to a first radio access technology or connected to said first node, check for the recovery from radio signals transmitted by said first node of an instruction to perform measurements at the communication device of radio signals according to a second radio access technology.

Embodiments are described in detail hereunder, by way of example only, with reference to the accompanying drawings, in which.

Figure 1:
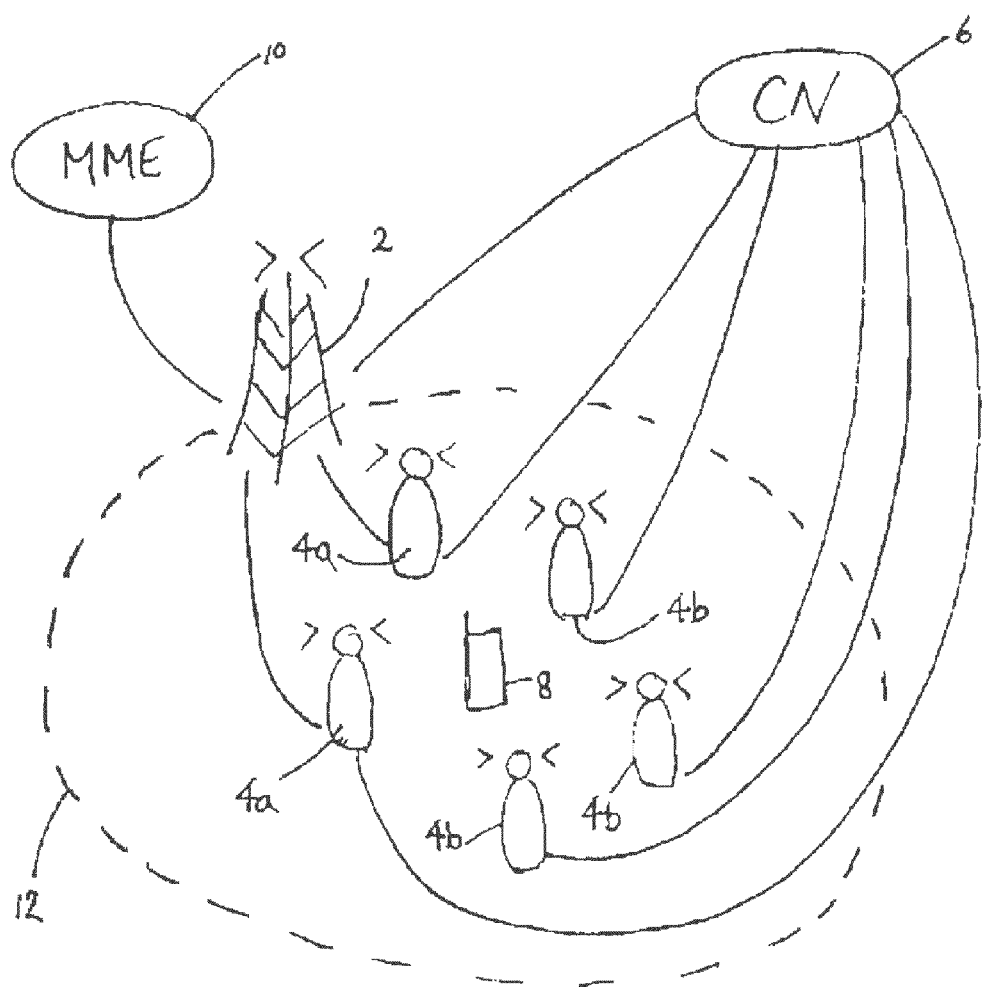
FIG. 1 illustrates a communication device in the coverage area of radio access nodes operating according to different radio access technologies.

FIG. 1 schematically shows an example of part of a cellular radio access network. The following description is for the example of a Long Term Evolution (LTE) radio access network, but the same technique is also applicable to other kinds of radio access networks. Similarly, the following description is for the example of aggregation of LTE and WiFi radio access technologies, but the same technique is also applicable to other combinations of radio access technologies, such as e.g. a combination of 5G and WiFi radio access technologies.

FIG. 1 only shows a single LTE eNodeB (eNB) 2, but a LTE cellular network will typically comprise thousands of LTE eNBs providing substantially continuous coverage over a wide geographical area. Similarly, FIG. 1 shows the coverage area 12 of one LTE cell operated via the LTE eNB 2, but a plurality of LTE cells having different coverage areas may be operated via the same LTE eNB 2. The LTE eNB 2 is connected to a mobile management entity (MME), which manages the handover of a communication device (UE) 8 between LTE cells. The LTE eNB 2 is also connected to a core network 6. A LTE cellular radio access network may also include other elements, but these are not shown in FIG. 1 for conciseness.

As shown in FIG. 1, the coverage area of the LTE eNB 2 is populated by a plurality of radio access nodes 4 operating according to a different radio access technology (RAT) such as e.g. WLAN access nodes operating according to a WiFi protocol. Some WLAN access nodes 4a are connected to the LTE eNB 2 and are capable of functioning as a slave node in a radio aggregation technique involving said LTE eNB 2 as a master node. Other WLAN access nodes 4b have no such radio aggregation capability, but are connected to the core network 6, and can be used for the uplink/downlink transfer of user plane data between the UE 8 and the core network 6 without control by the LTE eNB 2, whilst e.g. the UE 8 is camped in idle mode on LTE eNB 2, in a 3GPP Release 12 technique known as offloading.

Figure 4:
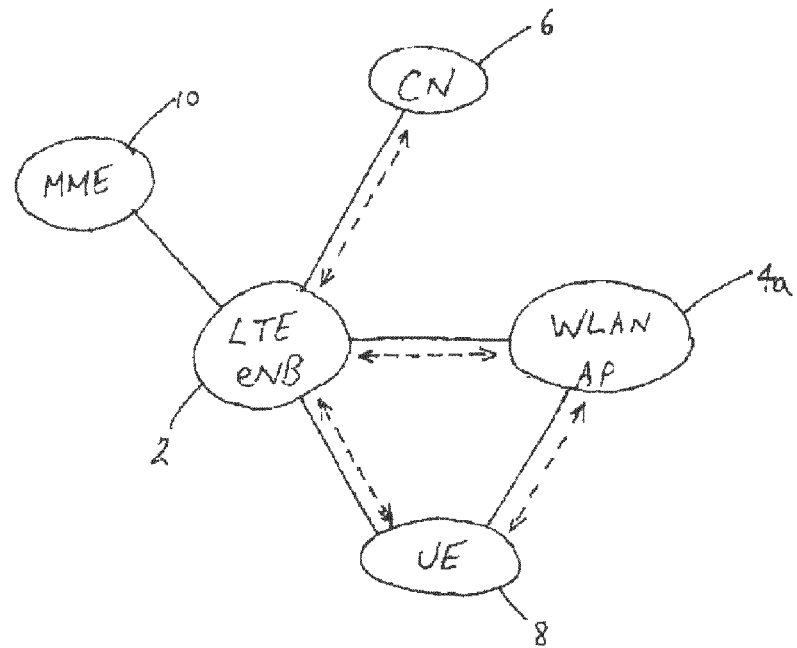
FIG. 4 illustrates an example of a radio aggregation technique involving radio access nodes operating according to different radio access technologies.

FIG. 4 illustrates an example of a radio aggregation technique in the system illustrated in FIG. 1. The dashed lines indicate the transfer of user plane data. User plane data is simultaneously transferred between the UE and the LTE eNB 2 both via (a) a radio connection between the UE 8 and the LTE eNB 2, and (b) a radio link between the UE 8 and the WLAN access point 4a and a wired link between the WLAN AP 4a and the LTE eNB 2, all under the radio resource control (RRC) of the LTE eNB 2. The LTE eNB 2 functions as master node (MeNB) and the WLAN AP 4a functions as slave node (or secondary node) (SeNB).

Figure 5:
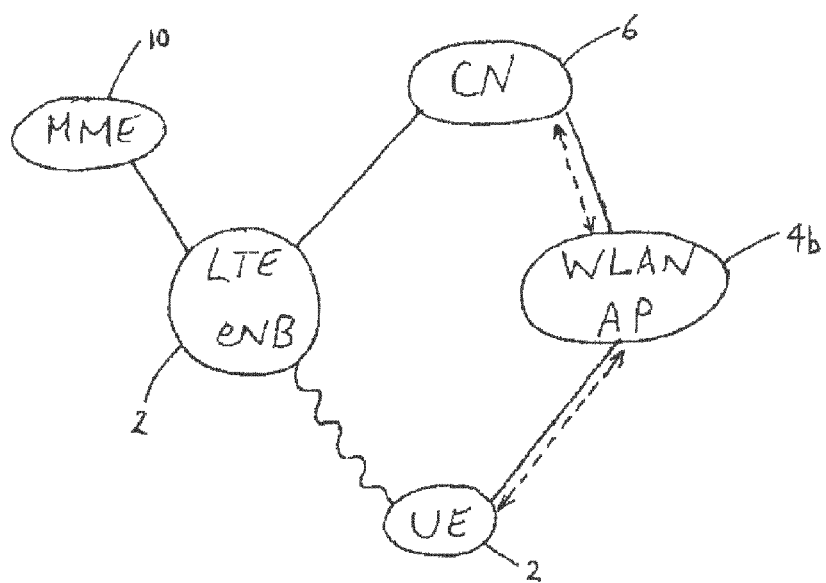
FIG. 5 illustrates an example of transmitting user plane data between a communication device and a core network solely via a radio access node operating according to a second radio access technology, whilst camped in idle mode on a radio access node operating according to a first radio access technology.

FIG. 5 illustrates an example of offloading of user plane data transfer from the LTE eNB 2 to a WLAN access node 4. Again, the dashed line indicates the transfer of user plane data. The wavy line between the UE 8 and the LTE eNB 2 indicates the example of the UE 8 being camped on the LTE eNB 2 in idle mode, i.e. there is no RRC connection between the UE 8 and the LTE eNB 2, but offloading of some user plane data to a WLAN access node 4 can also take place when the UE 8 is in RRC connected mode; a key feature of offloading is that the transfer of data to/from the core network 6 via the WLAN node 4 is not under the RRC control of the LTE eNB 2. The user plane data is exchanged directly between the core network 6 and the WLAN AP 4, and does not go via the LTE eNB 2.

Figure 2:
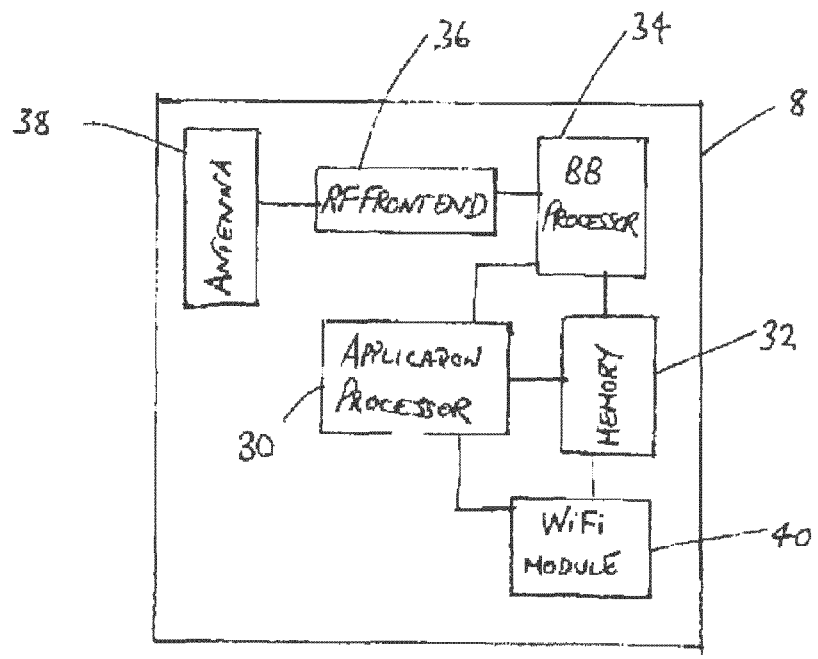
FIG. 2 illustrates an example of apparatus for use at the radio access nodes of FIG. 1.

FIG. 2 shows a schematic view of an example of apparatus for UE 8. The communication device (UE) 8 may be used for various tasks such as making and receiving phone calls, receiving and sending data from and to a data network, and experiencing, for example, multimedia or other content. The UE 8 may be any device at least capable of both recovering data/information from radio signals transmitted by the LTE eNB 2 and WiFi access nodes 4 of FIG. 2, and transmitting radio signals including data/information recoverable by the LTE eNB 2 and WiFi access nodes 4. Non-limiting examples of user equipment (UE) 8 include smartphones, tablets, personal computers, and devices without any user interface, such as devices that are designed for machine type communications (MTC).

With reference to FIG. 2, an application processor 30, operating in accordance with program code stored at memory 32, controls the generation and transmission of radio signals comprising user plane data via either (i) the combination of baseband processor 34 (which itself operates in accordance with program code stored at memory 32), radio-frequency front end 36 and antenna 38, or (ii) WiFi module 40. The RF front end may include an analogue transceiver, filters, a duplexer, and antenna switch. The combination of antenna 38, RF front end 36 and baseband processor 34 recovers user plane data from radio signals transmitted by the LTE eNB 2, for processing at application processor 40.

The baseband processor 34 and WiFi module 40 are also capable of recovering both user plane and control plane data from LTE and WiFi radio signals, respectively, and storing the recovered data in memory 32, for e.g. processing by the applications processor.

The application processor 30 and the baseband processor 34 may be implemented as separate chips or combined into a single chip. The memory 32 may be implemented as one or more chips. The memory 32 may include both read-only memory and random-access memory. The above elements may be provided on one or more circuit boards.

The UE may include other elements not shown in FIG. 2. For example, the UE 8 may include a user interface such as key pad 201, voice commands, touch sensitive screen or pad, combinations thereof or the like, via which a user may control operation of the UE 8. The UE 8 may also include a display, a speaker and a microphone. Furthermore, the UE 8 may comprise appropriate connectors (either wired or wireless) to other devices and/or for connecting external accessories, for example hands-free equipment, thereto.

Figure 3:
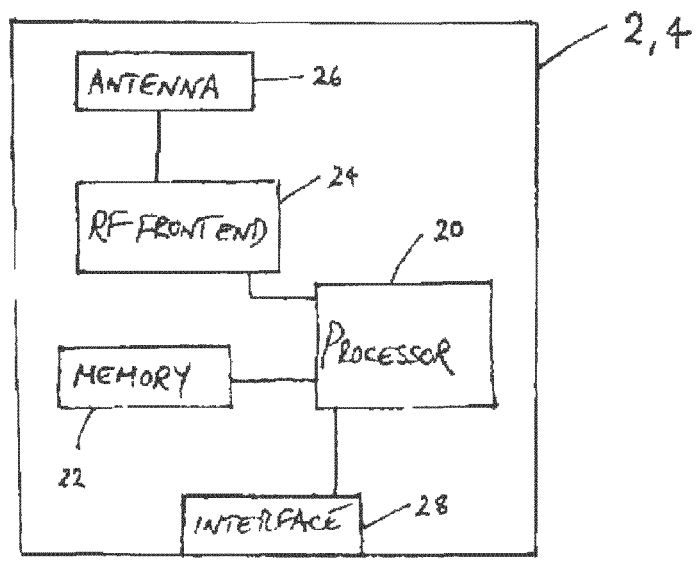
FIG. 3 illustrates an example of apparatus for use at the communication device of FIG. 1.

FIG. 3 shows an example of apparatus for use at the LTE eNB 2 and WLAN access nodes 4 of FIG. 1. A processor 20, operating in accordance with program code stored at memory 22, (a) controls the generation and transmission of LTE or WiFi radio signals comprising user plane data via the combination of radio-frequency front end 24 and antenna 26; and (b) recovers data from radio signals transmitted by the LTE eNB 2 or WLAN access nodes 4. The RF front end may include an analogue transceiver, filters, a duplexer, and antenna switch. Both the processor 20 and the memory may be implemented as one or more chips. The memory 22 may include both read-only memory and random-access memory. The above elements may be provided on one or more circuit boards. The apparatus also comprises an interface 28 for transferring data to and from one or more other network nodes such as e.g. the core network 6 (e.g. in both the above-described radio aggregation and offloading techniques) and other access nodes 2, 4 (e.g. in the radio aggregation technique described above).

It would be appreciated that the apparatus shown in each of FIGS. 2 and 3 described above may comprise further elements which are not directly involved with the embodiments of the invention described hereafter.

Figure 6:
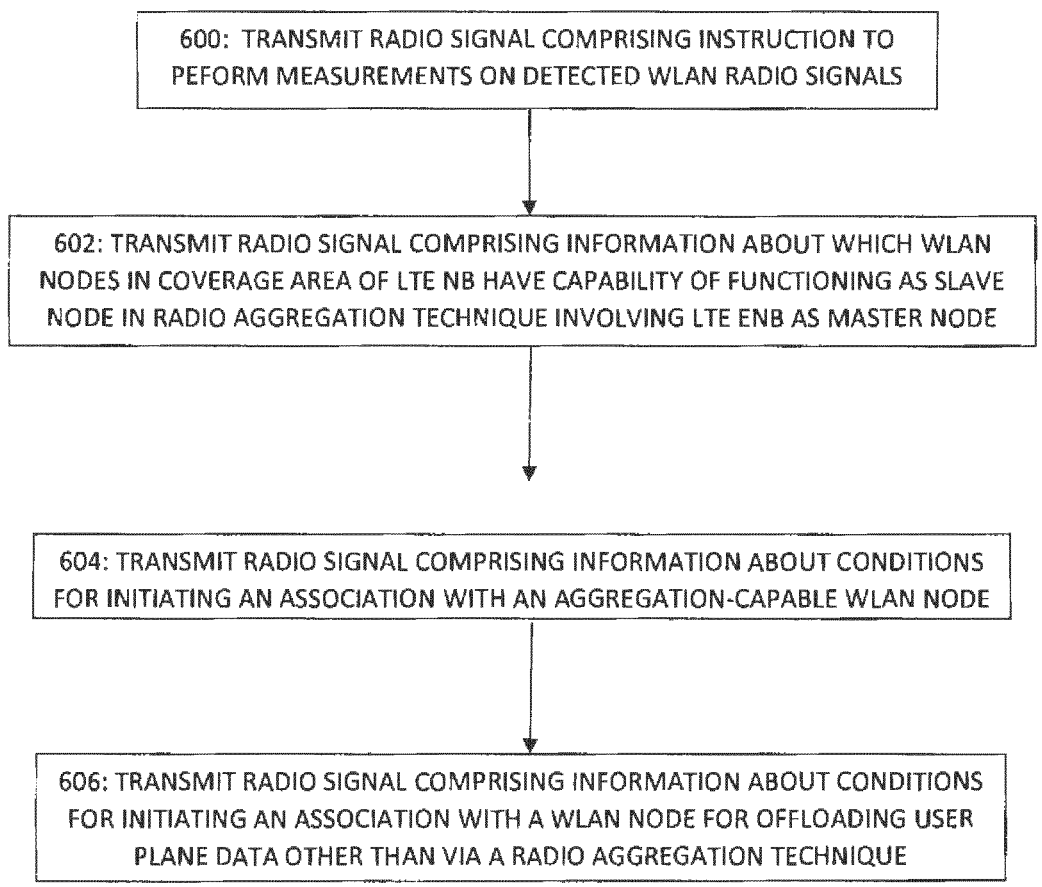
FIG. 6 illustrates an example of operations at a radio access node according to one embodiment.

FIG. 6 illustrates an example of set of operations at LTE eNB 2 according to one embodiment.

All operations carried out by the processor 20 follow program code stored at memory 22.

The processor 20 at LTE eNB 2 transmits via RF front end 24 and antenna 26 a LTE radio signal comprising an instruction to perform measurements on detected WLAN radio signals (STEP 600). This instruction may, for example, take the form of a "WLAN measurements enabled Flag".

The processor 20 at LTE eNB 2 also transmits via RF front end 24 and antenna 26 a LTE radio signal comprising information about which WLAN access nodes in the coverage area of LTE eNB 2 are capable of functioning as a slave node in a radio-aggregation technique involving LTE eNB 2 as master node (STEP 602). This information may comprise a list of identifiers (e.g. Service Set Identifier (SSID), Basic Service Set Identifier (BSSID), or Homogenous Extended Service Set Identifier (HESSID)) for the radio-aggregation capable WLAN nodes.

The processor 20 at LTE eNB 2 transmits via RF front end 24 and antenna 26 a LTE radio signal comprising information about one or more thresholds for initiating an association with a radio-aggregation capable WLAN node (STEP 604). For example, these thresholds may include one or more of: a maximum WLAN channel utilisation value, a minimum WLAN downlink backhaul rate, a minimum WLAN uplink backhaul rate, and a minimum beacon RSSI (received signal strength indicator), a minimum RSRP (reference signal received power) or RSRQ (reference signal received quality) level. These thresholds may be set such that they have the effect of prioritising the selection of an aggregation-capable WLAN node 4a, even if the WLAN node does not yet meet all the conditions for radio aggregation, and/or there are other WLAN nodes without aggregation capability that are better suited to the transfer of data between the UE 8 and the core network 6 in an offloading technique without control by the LTE eNB 2. The processor 20 at LTE eNB 2 may also transmit via RF front end 24 and antenna 26 a LTE radio signal comprising an instruction about whether to evaluate detected radio-aggregation capable WLAN nodes against these thresholds, or to simply inform the LTE eNB (if and when it next establishes a RRC connection with the LTE eNB 2) of the detection at UE 8 of a WLAN node identified by the LTE eNB 2 as a node having radio aggregation capability. This instruction may, for example, take the form of a "Release 13 aggregation rules enabled Flag", which can have one of two values: "TRUE" and "FALSE".

The processor 20 at LTE eNB 2 transmits via RF front end 24 and antenna 26 a LTE radio signal comprising information about one or more thresholds for initiating an association with a WLAN node for communicating user plane data to/from the core network 6 via the WLAN node without control by the LTE eNB 2, i.e. other than via a radio aggregation technique (STEP 606). For example, these thresholds may also include radio and load thresholds such as one or more of: a maximum WLAN channel utilisation value, a minimum WLAN downlink backhaul rate, a minimum WLAN uplink backhaul rate, a minimum beacon RSSI, and a minimum RSRP or RSRQ level. The processor at LTE eNB 2 may also transmit via RF front end 24 and antenna 26 a LTE radio signal from which the baseband processor 34 of the UE 8 can recover a list of WLAN access nodes 4 via which data can be transferred between the core network 6 and the UE 8 without control by the LTE eNB 2, such as e.g. the non-aggregation Wi-Fi offloading technique already under development for 3GPP Release 12. Also, the above-mentioned thresholds in STEP 606 may be part of Release 12 radio interworking assistance and rules/conditions.

The order in which the LTE eNB 2 transmits the radio signals shown in FIG. 6 is not limited to the order shown in FIG. 6. The LTE eNB 2 may transmit the radio signals in any order, and/or may transmit two or more of the radio signals simultaneously.

The above-mentioned radio signals may be part of broadcast signalling intended for any UE 8 camped on the LTE eNB 2 in idle mode, and with capability to recover the information/instruction from the radio signals. For example, the radio signals may be part of broadcast signalling including one or more system information blocks (SIB). Alternatively, the radio signals may be part of dedicated signalling intended for a single UE. For example, the information could form part of a RRC Connection Reconfiguration message or a RRC Connection Release message.

Figure 7:
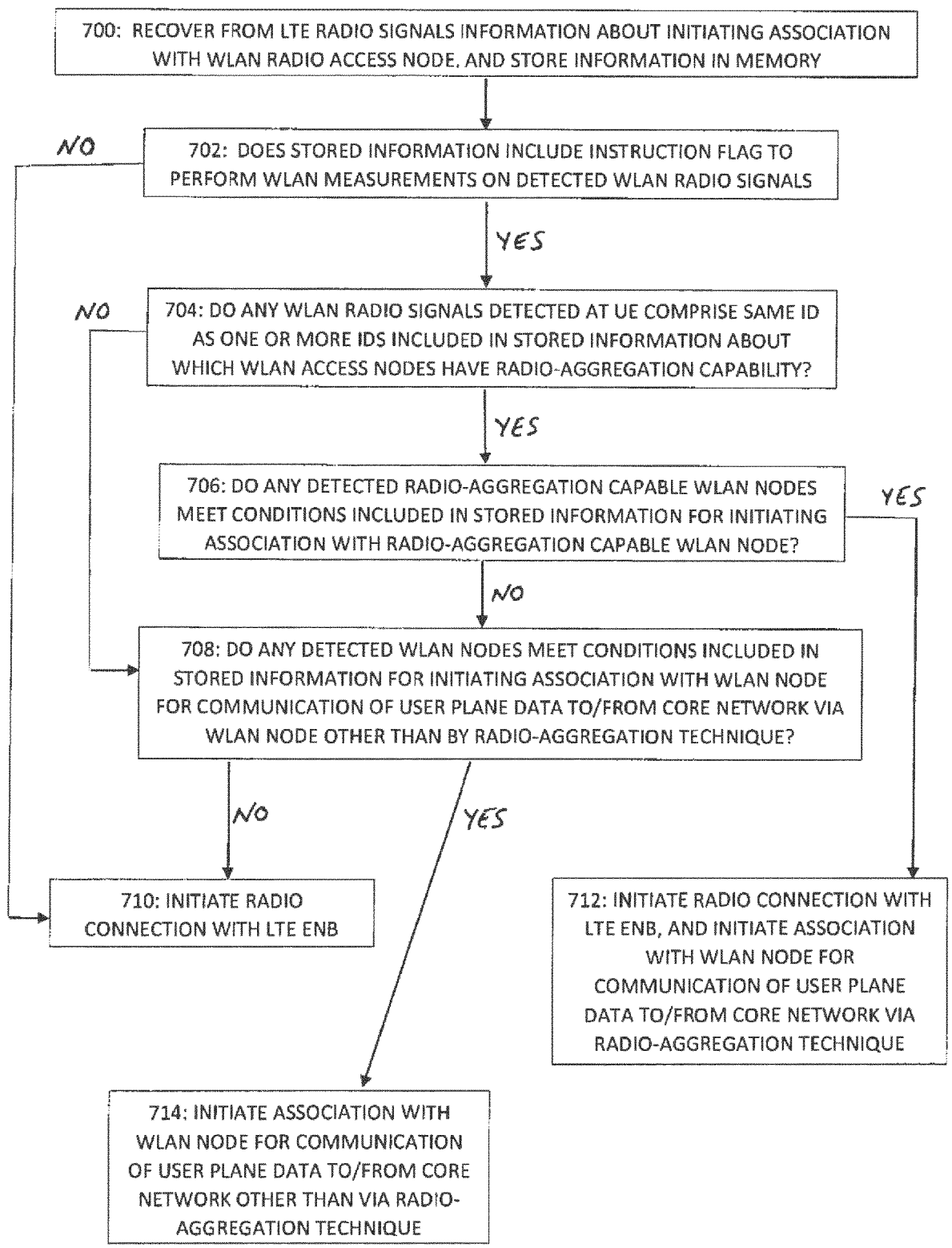
FIG. 7 illustrates an example of operations at a communication device according to one embodiment.

FIG. 7 illustrates an example of a set of operations at a UE according to one embodiment. All operations carried out by the processors 30, 34 follow program code stored at memory 22.

The UE 8 is camped in idle mode on LTE eNB 2. The baseband processor 34 recovers all the above-mentioned information/instruction from LTE radio signals detected at UE 8, and stores the information/instructions in memory 32.

When application processor 30 detects that there is user plane data to send to the core network 6 or user plane data to be received from the core network 6, the application processor 30 determines for a given data flow/bearer whether to (i) initiate an RRC connection solely with the LTE eNB 2, (ii) initiate an association solely with a WLAN node 4, or (iii) initiate an RRC connection with the LTE eNB 2 and initiate an association with a WLAN node for LTE-WLAN radio aggregation. The application processor 30 first checks the information stored in memory 32 to determine whether there is an instruction to perform WLAN measurements on WLAN radio signals and/or to read from the WLAN beacon detected at UE 8 information about WLAN load levels (such as BSS (Basic Service Set) load) (STEP 700). In more detail, the application processor 30 checks whether the "WLAN measurements enabled flag" stored by baseband processor 34 in memory 32 is "TRUE" or "FALSE".

If the determination is negative (i.e. the flag is "FALSE"), the application processor 32 initiates via baseband processor 34, RF front end 36 and antenna 38 the establishment of a RRC connection with LTE eNB 2 for the communication of user plane data to/from the core network 6 via a radio link with the LTE eNB 2, without identifying any detected WLAN node in the RRC connection request message. This flag enables the LTE eNB 2 to control whether the idle mode UE 8 should prioritise connection setup in EUTRAN in order to activate LTE-WLAN radio aggregation, even without the UE 8 performing any WLAN measurements, i.e. without using any knowledge discovered and stored at UE 8 about the WiFi radio and load conditions and even without using any indication about which WLAN nodes 4 are capable of radio aggregation. This could be useful, for example, when a WLAN access node is co-located with LTE eNB 2, and the use of the co-located WLAN access node is favoured by the network for radio-aggregation over any other WLAN node detectable by UE 8.

On the other hand, if the determination of STEP 702 is positive (the flag is "TRUE"), the application processor 30 instructs the WiFi module 40 to make measurements of the WLAN radio signals detected at UE 8. The WiFi module 40 stores in memory 32 information about the detected WLAN radio signals, including: one or more WLAN node IDs identified from the detected WLAN radio signals; measurements of the Beacon RSSI for each detected WLAN node; and metrics information recovered from the WLAN radio signals about radio and load conditions (such as channel utilisation rate, downlink backhaul rate and uplink backhaul rate) for each detected WLAN node 4.

The application processor 30 determines whether any one or more of the WLAN node IDs stored by the WiFi module 40 in the memory 32 match the WLAN node IDs identified in information recovered from LTE radio signals by baseband processor 34 about which WLAN nodes have radio-aggregation capability (STEP 704).

If the determination of STEP 704 is positive, the application processor 30 determines, based on the WiFi signal measurement information stored by WiFi module 40 in memory 32 and the threshold information stored in memory 32 by baseband processor 34, whether any of the detected radio-aggregation capable WLAN nodes 4a meet the conditions for initiating an association with a WLAN node (STEP 706). If more than one radio-aggregation capable WLAN node 4a meets the conditions, the application processor 30 selects the radio-aggregation capable WLAN node 4a that best meets the conditions.

If the determination of STEP 706 is positive, the application processor 30 (a) initiates via baseband processor 34, RF front end 36 and antenna 38 the establishment of a RRC connection with LTE eNB 2 and (b) also initiates via WiFi module 40 an association with the selected WLAN node, for the communication of user plane data to/from the core network via a radio aggregation technique involving both the LTE eNB 2 and the selected WLAN node 4a (STEP 712). The application processor 30 may perform operations (a) and (b) at the same time, in order to complete the WLAN AP association procedure (which may e.g. take up to a few seconds, and is typically longer than the time required to establish the necessary RRC connection with LTE eNB 2) as soon as possible. The UE 8 includes in the RRC connection request message to LTE eNB 2 the ID of the radio-aggregation capable WLAN node 4a selected by the application processor 30 as best meeting the specified radio and load conditions, and may also include the radio and load conditions (e.g. RSSI threshold, etc.) for the selected WLAN node. The processor 20 at LTE eNB 2 may then determine whether to establish radio-aggregation for the UE 8 on the basis of this feedback information from the UE 8, i.e. without the need for configuring the UE 8 for further measurement and reporting.

More generally, the RRC connection request in STEPs 710 and 712 may identify the "Establishment Cause" as "mo-Date-R13Aggregation", "mo-Data-NoR12Interworking", or "mo-Data-R12InterworkingAssociationFailure", or by similar cause identifiers, where "mo" stands for "mobile originating".

If the determination of either STEP 704 or STEP 706 is negative (or if the baseband processor 34 fails to recover the threshold information for STEP 706 from radio signals detected at the UE 8), the application processor 30 determines, based on the WiFi signal measurement information stored by WiFi module 40 in memory 32 and the threshold information stored in memory 32 by baseband processor 34, whether any of the detected WLAN nodes 4 meet the conditions for initiating an association with a WLAN node (STEP 708). If more than one WLAN node 4 meets the conditions, the application processor 30 selects the WLAN node that best meets the conditions. As mentioned above, the processor at LTE eNB 2 may also transmit a list of WLAN access nodes 4 via which data can be transferred between the core network 6 and the UE 8 without control by the LTE eNB 2, such as e.g. the non-aggregation Wi-Fi offloading technique already proposed for 3GPP Release 12; and the UE 8 may limit its selection to a WLAN node included in such list. Also, the above-mentioned thresholds/conditions of STEP 708 may be part of Release 12 radio interworking assistance and rules/conditions.

If the determination of STEP 708 is positive, the application processor initiates via WiFi module 40 an association with the selected WLAN node 4b, for communication of user plane data to/from the core network 6 via the WLAN node 4b, i.e. without control by the LTE eNB 2 (STEP 714).

If the determination of STEP 708 is negative (or if the baseband processor 34 fails to recover the threshold information for STEP 708 from radio signals detected at the UE 8), the application processor 30 initiates via baseband processor 34, RF front end 36 and antenna 38 the establishment of a RRC connection with LTE eNB for the communication of user plane data to/from the core network 6 via a radio link with the LTE eNB, without identifying any WLAN node in the RRC connection request message (STEP 710).

If the LTE radio signals transmitted by the LTE eNB 2 include the above-mentioned "Release 13 aggregation rules enabled Flag", then after a positive determination in STEP 704, the UE application processor 30 checks the status of this flag stored by baseband processor 34 in memory 32. The application processor 30 proceeds to STEP 706 if the flag is "TRUE". If the flag is "FALSE", the application processor 30 initiates the establishment of a RRC connection with LTE eNB 2, and initiates an association with one of the detected radio-aggregation capable WLAN nodes 4a, based on other criteria (i.e. criteria other than the conditions of STEP 706) for selecting a WLAN node, such as e.g. (a) UE implementation and/or IEEE 802.11/WiFi Alliance (WFA) specifications based on measurements of one or more of signal level, load, backhaul capacity, user throughput, or (b) some other instruction recovered from LTE eNB radio signals detected at UE 8, such as an instruction to select a certain WLAN node.

In the above-described embodiments, the initiation of a new connection with the LTE eNB 2 may, for example, proceed according to Section 5.3.3 of 3GPP TS 36.331, and the initiation of an association with a WLAN node 4 many, for example, proceed according to Section 10.3 of IEEE Standard 802.11.

Providing the idle mode UE 8 with information about which WLAN nodes in the coverage area of LTE eNB 2 have radio-aggregation capability enables prioritising an association with a radio-aggregation WLAN node that meets the radio and load conditions (but does not necessarily best meet the radio and load conditions out of all the WLAN nodes detected by UE 8) over a WLAN node that betters meets the radio and load conditions for WiFi offloading, but is without the same radio-aggregation capability.

The above-described embodiment involves selecting a WLAN node (or not selecting any WLAN node but only initiating a new connection with the LTE eNB) based on threshold information recovered from LTE eNB 2 radio signals detected at the UE 8. In one example variation, the threshold information is pre-stored in the UE memory 32 and is available to the applications processor 30 without requiring the LTE network to include the threshold information in any radio signals.

The above-described embodiment involves a UE 8 camped in idle mode on the LTE eNB 2. In one example variation, the UE 8 is already connected to the LTE eNB 2 (i.e. is already in a RRC connected mode), but the UE 8 performs the operations described above for a new data flow/bearer (e.g. for a new call) between the UE 8 and the core network 6.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
   receiving, at a communication device, information from a base station operating according to a first radio access technology, wherein said information indicates a first set of one or more conditions for evaluating initiation of an association with a first node operating according to a second radio access technology and having a capability of functioning as a slave node in a radio aggregation technique operating under the radio resource control of the base station involving the base station as a master node, and a second set of one or more conditions for evaluating initiation of an association with a second node operating according to said second radio access technology without said aggregation capability;
   determining based at least partly on the received information, at the communication device camped in idle mode on the base station or already connected to the base station, to initiate a new connection with the base station and/or to initiate the association with the first node in the radio aggregation technique or to initiate the association with the second node without the aggregation capability; and
   initiating the new connection with the base station and/or the association with the first or the second node based on the determination.

2. The method according to claim 1, wherein the received information further indicates which nodes operating according to a second radio access technology in an area served by said first node have a capability of functioning as a slave node using the radio aggregation technique involving the base station as a master node.

3. The method according to claim 2, further comprising: determining whether radio signals detected at the communication device identify one or more second radio access technology nodes identified in said information.

4. The method according to claim 1, further comprising:
   determining, based at least partly on radio signals detected at the communication device, whether the first node meets said first set of conditions; and
   in the event of a positive determination, initiating the association with the first node that meets said first set of conditions.

5. The method according to claim 1, further comprising:
   in the event of detecting no second radio access technology node that meets said first set of conditions, determining, based at least partly on radio signals detected at the communication device, whether the second node meets said second set of conditions; and
   in the event of a positive determination, initiating the association with the second node that meets said second set of conditions.

6. The method according to claim 1, further comprising:
   in the event of a determination that no detected second radio access technology node meets said second set of conditions, initiating the new connection with the base station.

7. An apparatus comprising: a processor and memory including computer program code, wherein the memory and computer program code are configured to, with the processor, cause the apparatus to:
   receive information from a base station operating according to a first radio access technology, wherein said information indicates a first set of one or more conditions for evaluating initiation of an association with a first node operating according to a second radio access technology and having a capability of functioning as a slave node in a radio aggregation technique operating under the radio resource control of the base station involving the base station as a master node, and a second set of one or more conditions for evaluating initiation of an association with a second node operating according to said second radio access technology without said aggregation capability;
   determine based at least partly on the received information, at the apparatus camped in idle mode on the base station or already connected to the base station, to initiate a new connection with the base station and/or to initiate the association with the first node in the radio aggregation technique or to initiate the association with the second node without the aggregation capability; and initiate the new connection with the base station and/or the association with the first or the second node based on the determination.

8. The apparatus according to claim 7, wherein said information further indicates which nodes operating according to a second radio access technology in an area served by the base station have a capability of functioning as a slave node using the radio aggregation technique involving the base station as a master node.

9. The apparatus according to claim 8, wherein the memory and computer program code are further configured to, with the processor, cause the apparatus to:

determine whether radio signals detected at the apparatus identify one or more second radio access technology nodes identified in said information.

10. The apparatus according to claim 7, wherein the memory and computer program code are further configured to, with the processor, cause the apparatus to:

determine, based at least partly on radio signals detected at the apparatus, whether the first node meets said first set of conditions; and in the event of a positive determination, initiate the association with the first node that meets said first set of conditions.

11. The apparatus according to claim 7, wherein the memory and computer program code are further configured to, with the processor, cause the apparatus to:

perform measurements of radio signals transmitted by nodes according to the second radio access technology.

12. An apparatus according to claim 7, wherein the memory and computer program code are further configured to, with the processor, cause the apparatus to:

in the event of detecting no second radio access technology node that meets said first set of conditions, determine, based at least partly on radio signals detected at the apparatus, whether the second node meets said second set of conditions; and in the event of a positive determination, initiate the association with the second node.

13. An apparatus according to claim 7, wherein the memory and computer program code are further configured to, with the processor, cause the apparatus to:

in the event of a determination that no detected second radio access technology node meets said second set of conditions, initiate the new connection with the base station.

14. An apparatus comprising: a processor and memory including computer program code, wherein the memory and computer program code are configured to, with the processor, cause the apparatus to:

receive information from a base station operating according to a first radio access technology, wherein said information indicates a first set of one or more conditions for evaluating initiation of an association with a first node operating according to a second radio access technology and having a capability of functioning as a slave node in a radio aggregation technique operating under the radio resource control of the base station involving the base station as a master node, and a second set of one or more conditions for evaluating initiation of an association with a second node operating according to said second radio access technology without said aggregation capability;

determine based at least partly on the received information, at the apparatus camped in idle mode on the base station or already connected to the base station, whether to prioritize initiating the association with the first node in the radio aggregation technique over initiating the association with the second node without the aggregation capability;

select a second radio access technology node with which to initiate an association based on the determination; and initiate the association with the selected second radio access technology node.

15. The apparatus according to claim 14, wherein said information further indicates which nodes operating according to a second radio access technology in an area served by the base station have a capability of functioning as a slave node using the radio aggregation technique involving the base station as a master node.

16. The apparatus according to claim 15, wherein the memory and computer program code are further configured to, with the processor, cause the apparatus to:

determine whether radio signals detected at the apparatus identify one or more second radio access technology nodes identified in said information.

17. The apparatus according to claim 14, wherein the memory and computer program code are further configured to, with the processor, cause the apparatus to:

determine, based at least partly on radio signals detected at the apparatus, whether the first node meets said first set of conditions; and in the event of a positive determination, initiate the association with the first node that meets said first set of conditions.

18. The apparatus according to claim 14, wherein the memory and computer program code are further configured to, with the processor, cause the apparatus to:

perform measurements of radio signals transmitted by nodes according to the second radio access technology.

19. An apparatus according to claim 14, wherein the memory and computer program code are further configured to, with the processor, cause the apparatus to:

in the event of detecting no second radio access technology node that meets said first set of conditions, determine, based at least partly on radio signals detected at the apparatus, whether the second node meets said second set of conditions; and in the event of a positive determination, initiate an association with the second node.

20. An apparatus according to claim 14, wherein the memory and computer program code are further configured to, with the processor, cause the apparatus to:

in the event of a determination that no detected second radio access technology node meets said second set of conditions, initiate a new connection with the base station.

* * * * *